US012337351B1

(12) United States Patent
Bacon et al.

(10) Patent No.: US 12,337,351 B1
(45) Date of Patent: *Jun. 24, 2025

(54) AUTOMATED TESTING OF SEALABLE BAGS

(71) Applicants: Aaron Thomas Bacon, Garden Grove, CA (US); Aerick William Bacon, Garden Grove, CA (US); Thomas Dell Bacon, Garden Grove, CA (US)

(72) Inventors: Aaron Thomas Bacon, Garden Grove, CA (US); Aerick William Bacon, Garden Grove, CA (US); Thomas Dell Bacon, Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,485

(22) Filed: Sep. 18, 2023

Related U.S. Application Data

(63) Continuation of application No. 17/671,131, filed on Feb. 14, 2022, now Pat. No. 11,801,533.

(60) Provisional application No. 63/295,748, filed on Dec. 31, 2021.

(51) Int. Cl.
*B07C 5/10* (2006.01)
*B07C 5/12* (2006.01)
*B07C 5/36* (2006.01)

(52) U.S. Cl.
CPC .................. *B07C 5/10* (2013.01); *B07C 5/12* (2013.01); *B07C 5/36* (2013.01)

(58) Field of Classification Search
CPC ................ B07C 5/10; B07C 5/12; B07C 5/36
USPC ................................ 209/586, 529, 597, 598
See application file for complete search history.

(56) References Cited

U.S. PATENT DOCUMENTS

| | | | | |
|---|---|---|---|---|
| 4,510,730 | A | 4/1985 | Edmondson | 53/53 |
| 4,697,452 | A | 10/1987 | Prakken | 73/49.3 |
| 4,955,226 | A | 9/1990 | Beaty et al. | 73/49.3 |
| 5,507,177 | A | 4/1996 | Focke | 73/49.3 |
| 6,094,888 | A | 8/2000 | Pazdernik et al. | G01M 3/36 |
| 6,105,419 | A | 8/2000 | Michels et al. | 73/49.3 |

(Continued)

FOREIGN PATENT DOCUMENTS

| | | |
|---|---|---|
| EP | 3062081 | 8/2016 |
| JP | 2006-038458 | 2/2006 |

(Continued)

OTHER PUBLICATIONS

Yokota; Suketsugu, “Apparatus and Method for Checking Seal” (English Translation), Feb. 9, 2006, worldwide.espacenet.com (Year: 2006).*

(Continued)

*Primary Examiner* — Michael McCullough
*Assistant Examiner* — Molly K Devine
(74) *Attorney, Agent, or Firm* — Venable LLP

(57) ABSTRACT

Automated sorting of a sealable bag includes contactlessly scanning a surface or surfaces of a sealable bag (upper or lower surface or both) as the sealable bag is conveyed past an inspection station; obtaining a surface profile topology of the scanned surface; calculating apparent volume of the sealable bag from the surface profile topology; determining whether the apparent volume is within volume thresholds of over filled, under filled and unsealed bags; and sorting the sealable bag to a discard station responsive to a determination that the apparent volume of the sealable bag does not fit within the selected threshold(s).

34 Claims, 6 Drawing Sheets

(56) References Cited

U.S. PATENT DOCUMENTS

| | | | | |
|---|---|---|---|---|
| 6,568,247 | B2 | 5/2003 | Taylor | 73/49.3 |
| 6,717,087 | B1 | 4/2004 | Wecke et al. | G01B 11/04 |
| 7,900,502 | B2 | 3/2011 | Yokota et al. | 73/49.3 |
| 9,346,170 | B2 | 5/2016 | Baylor et al. | G05B 19/00 |
| 9,518,891 | B2 | 12/2016 | Subhash et al. | G01M 3/366 |
| 2015/0316441 | A1 | 11/2015 | Subhash et al. | 73/49.3 |

FOREIGN PATENT DOCUMENTS

| | | |
|---|---|---|
| WO | 1993/007459 | 4/1993 |
| WO | 2005/005949 | 1/2005 |
| WO | 2011/026585 | 3/2011 |
| WO | 2017/069199 | 4/2017 |
| WO | 2019/035711 | 2/2019 |

OTHER PUBLICATIONS

Ishida, High-performance In-Line Seal Tester TSC-RVS, May 31, 2019.

Taptone, Leak Detection on Stand-up Pouches, Dec. 31, 2015.

Keyence Laser Profiler, LJ-X8000 Series, User's Manual (3D Mode), Jun. 2020.

Keyence LJ-X8000 Series, Easy Configuration Manual, 3D Mode Edition, Jan. 2020.

* cited by examiner

AUTOMATED TESTING OF SEALABLE BAGS

CROSS-REFERENCE TO RELATED APPLICATIONS

This application is a continuation of U.S. application Ser. No. 17/671,131 filed Feb. 14, 2022, and claims benefit of priority from U.S. Provisional Application No. 63/295,748 filed Dec. 31, 2021, the contents of all of which are incorporated by reference as if set forth herein in full.

BACKGROUND

1. Technical Field

The field generally relates to systems for the automated sorting of sealable bags and methods of use thereof.

2. Discussion of Related Art

Currently, the determination of whether a sealable bag is properly sealed for airtightness, and the subsequent sorting and packing of the sealable bag, is a labor-intensive process with inherent inefficiencies. There remains a need for apparatus and method for automating the process.

SUMMARY

According to certain aspects described herein, a determination of whether a sealable bag is or is not properly sealed involves contactless scanning of a surface or surfaces of the sealable bag (upper or lower surface or both) as the sealable bag is conveyed past an inspection station so as to obtain a surface profile topology of the surface, or three-dimensional rendering thereof. The determination of proper sealing is made by calculating apparent volume of the sealable bag from the surface profile topology and determining whether the apparent volume exceeds a threshold, or minimum dimensions are obtained over a sufficient area. This method also allows for a determination of the "air fill" of the bag, which allows a determination of over-filled and under-filled air filled bags. Over filled bags may have difficulty fitting into secondary packaging. Under air filled bags may not have sufficient air to prevent the contents (such as snack chips) from breaking during handing, secondary packaging and transportation.

Because scanning and three-dimensional profiling of the sealable bag is contactless, an advantageous effect is obtained whereby the determination of a proper seal is made with little to no pressure applied to the bag, which itself might cause a rupture in an otherwise properly sealed bag. Moreover, scanning of the sealable bag can be completed quickly, resulting in rapid throughput on a continuous basis.

In more detail, an apparatus for automated sorting of a sealable bag, comprises a conveyor configured to convey a sealable bag past an inspection station; a scanner configured and positioned to contactlessly scan a surface or surfaces of the sealable bag (upper or lower surface or both) as the sealable bag passes through the inspection station, and to obtain a surface profile topology of the scanned surface; a controller configured to calculate apparent volume of the sealable bag from the surface profile topology or from the three-dimensional profiling, and to determine whether the apparent volume is within volume thresholds of over filled, under filled and unsealed bags; and a sorting mechanism. The sorting mechanism is controlled by the controller to sort the sealable bag to a discard station responsive to a determination that the apparent volume of the sealable bag does not fit within the selected threshold(s).

A method for automated sorting of a sealable bag, comprises contactlessly scanning a surface or surfaces of the sealable bag (upper or lower surface or both) of a sealable bag as the sealable bag is conveyed past an inspection station; obtaining a surface profile topology of the scanned surface; calculating apparent volume of the sealable bag from the surface profile topology; determining whether the apparent volume falls within selected thresholds including thresholds such as over filled, under filled and unsealed bags; and sorting the sealable bag to a discard station responsive to a determination that the apparent volume of the sealable bag does not fit within the selected threshold(s).

The scanned surface of the sealable bag may be contactlessly scanned by means of one or more than one of light, lidar, patterned light, sonar, acoustic, and radar. The threshold may a predetermined threshold selected in accordance with expected size of the sealable bag, or the threshold may be a calculated threshold based on the horizontal extent of the sealable bag as calculated based on the surface profile. The apparent volume may be calculated under an assumption that the unscanned surface of the sealable bag is similar to the scanned surface, e.g., a mirror image of the scanned surface. The sealable bag may be shaped prior to scanning at the inspection station, such as by flattened by a leveling mechanism or tamped by a tamping mechanism prior to scanning at the inspection station, especially for ensuring that the unscanned surface is similar to the scanned surface, for improved accuracy in calculation of the apparent volume, and for increased consistency in the appearance of the bag at the inspection station.

In other aspects, the determination of whether the scanned bag meets the selected threshold or thresholds (over filled, under filled and/or unsealed bag) may be made based on horizontal extent (i.e., size) and scanned height of the bag.

Further objectives and advantages will become apparent from a consideration of the description, drawings, and examples.

DETAILED DESCRIPTION

Some embodiments of the current disclosure herein are discussed in detail below. In describing embodiments, specific terminology is employed for the sake of clarity. However, the disclosure herein is not intended to be limited to the specific terminology so selected. A person skilled in the relevant art will recognize that other equivalent components can be employed, and other methods developed, without departing from the broad concepts of the current disclosure herein. Any reference cited anywhere in this specification, including the Background and Detailed Description sections, is incorporated by reference in its entirety.

In general, embodiments of the disclosure involve a conveyor configured to convey a sealable bag past an inspection station; a scanner configured and positioned to contactlessly scan a surface or surfaces (upper or lower or both) of the sealable bag as the sealable bag passes through the inspection station, and to obtain a surface profile topology of the scanned surface; a controller configured to calculate apparent volume of the sealable bag from the surface profile topology, and to determine whether the apparent volume fits within a threshold or thresholds signifying over-filling, under-filling or unsealed bags; and a sorting mechanism controlled in response to a determination of whether that the apparent volume of the sealable bag does or does not fit within the threshold(s).

Figure 1A:
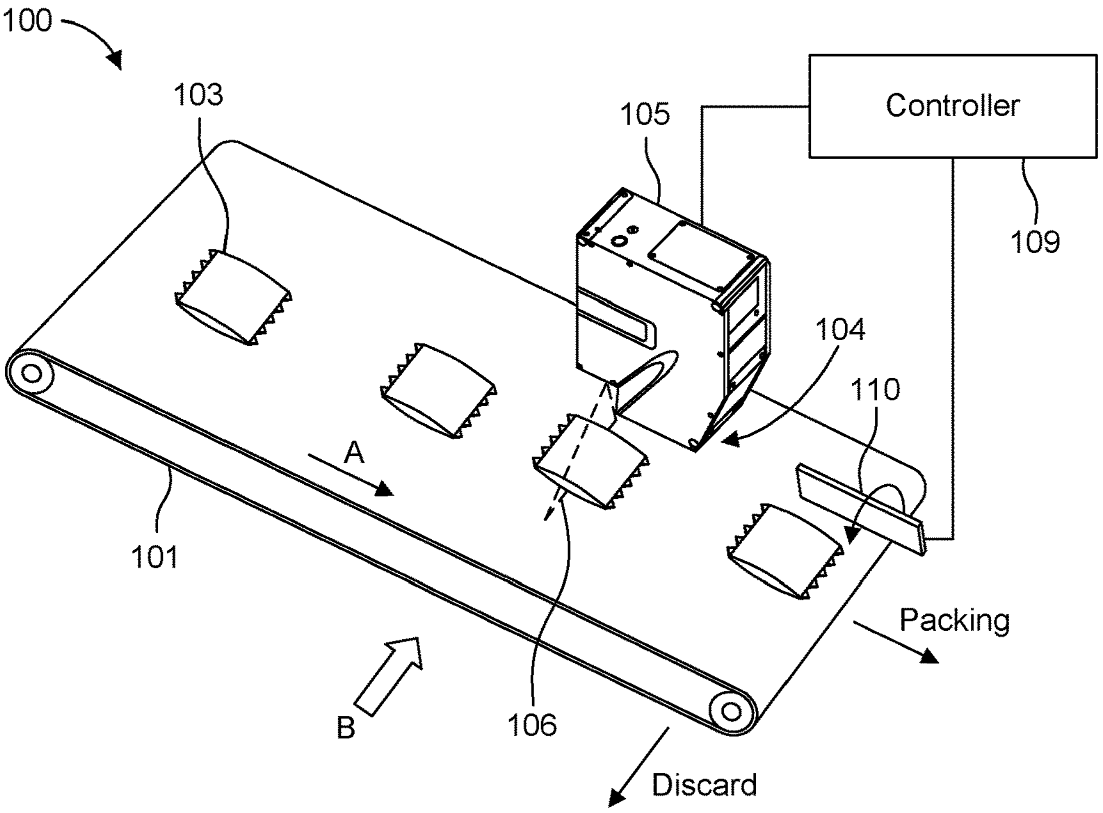
FIG. 1A is a schematic overview showing one example embodiment of a sorting apparatus according to the description herein, demonstrating scanning of the upper surface from the top.

FIG. 1A is a schematic overview showing one example embodiment of a sorting apparatus 100 according to the description herein.

As depicted in FIG. 1A, sorting apparatus 100 includes a conveyor 101 configured to convey sealable bags 103 in the direction of arrow A past an inspection station indicated generally at 104. Scanner 105 is positioned at the inspection station and is configured for contactless scanning of one of the surfaces of bag 103, here, the upper surface of bag 103. More specifically, scanner 105 contactlessly obtains multiple scan lines by scanning at 106 of the upper surface of bag 103 as the bag moves through the inspection station, so as to permit construction of a surface shape profile of the scanned surface.

In one embodiment, scanner 105 is a surface height profiler using a laser light curtain to measure surface height across multiple scan lines as bag 103 advances through inspection 104. In one example, scanner 105 may be an LJ-X8000 Series Laser Profiler available from Keyence Corporation of America, which performs 2D/3D measurements and inspections of the surface shape of objects in line with conveyance of the object. However, in other embodiments, it should be understood that other scanners may be used for contactless measurement of the surface profile of bag 103 as it passes through the inspection station, such as contactless scanners that rely on light, lidar, patterned light, sonar, acoustic, radar, and so forth, to obtain a surface profile topology of the scanned surface of bag 103 without contacting to the bag.

Figure 1B:
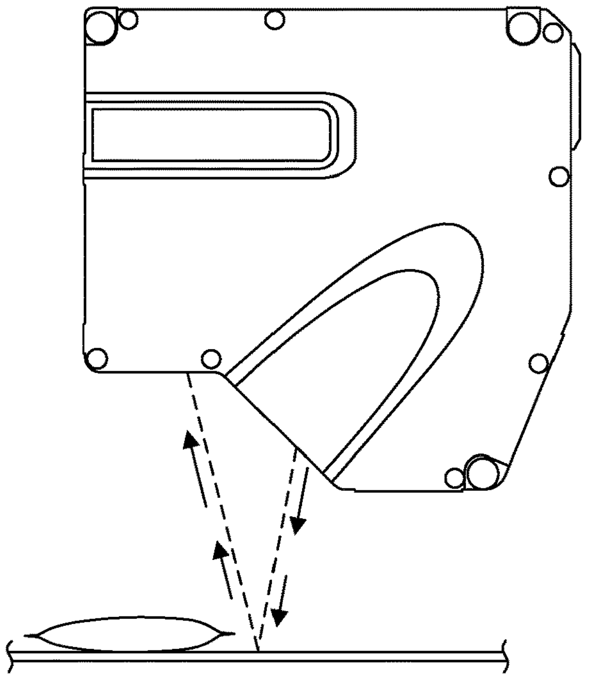
FIGS. 1B and 1C are views showing the field of view for the scanner of FIG. 1A, in the direction of arrow B and the direction orthogonal to arrow B, respectively.
Figure 1C:
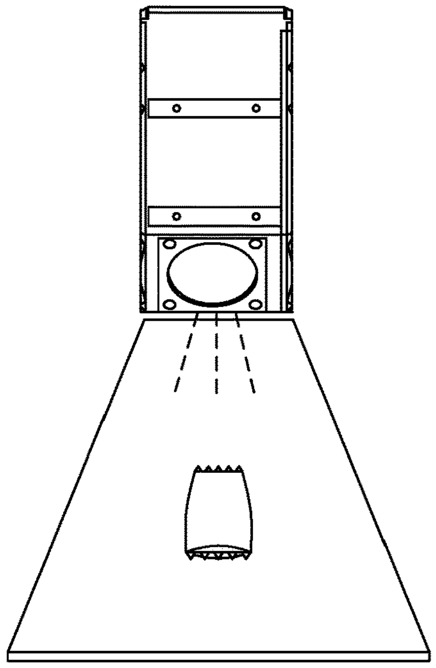

FIGS. 1B and 1C are views showing the field of view for scanner 105 in the direction of arrow B (of FIG. 1A) and in the direction orthogonal to arrow B, respectively.

Figure 2A:
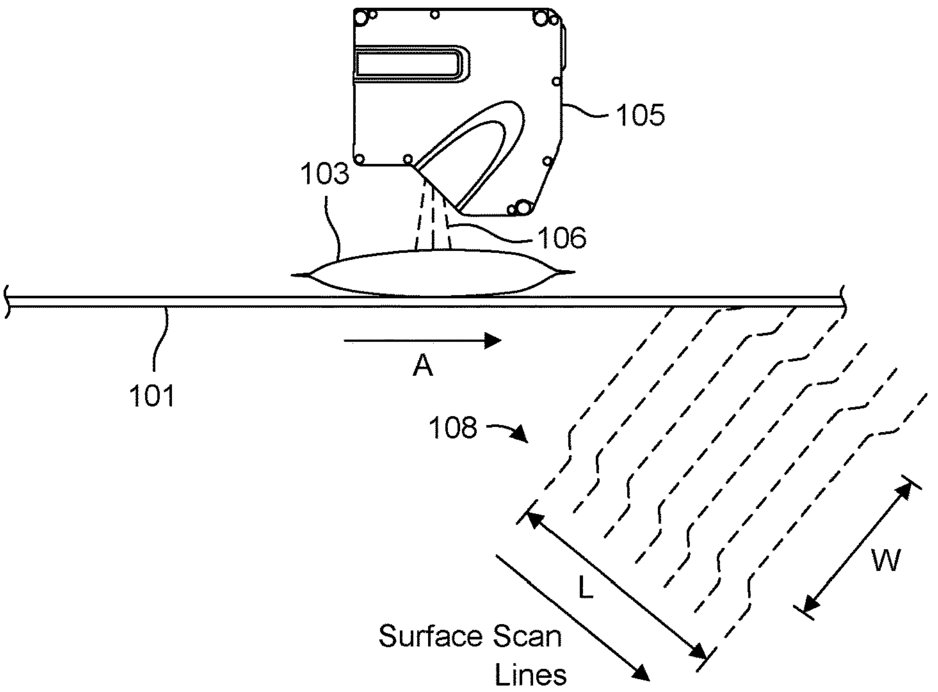
FIGS. 2A and 2B are examples of scan lines derived from scanning a surface (here, the upper surface) of a sealable bag, respectively showing scan lines for a properly sealed bag and an inadequately sealed bag.
Figure 2B:
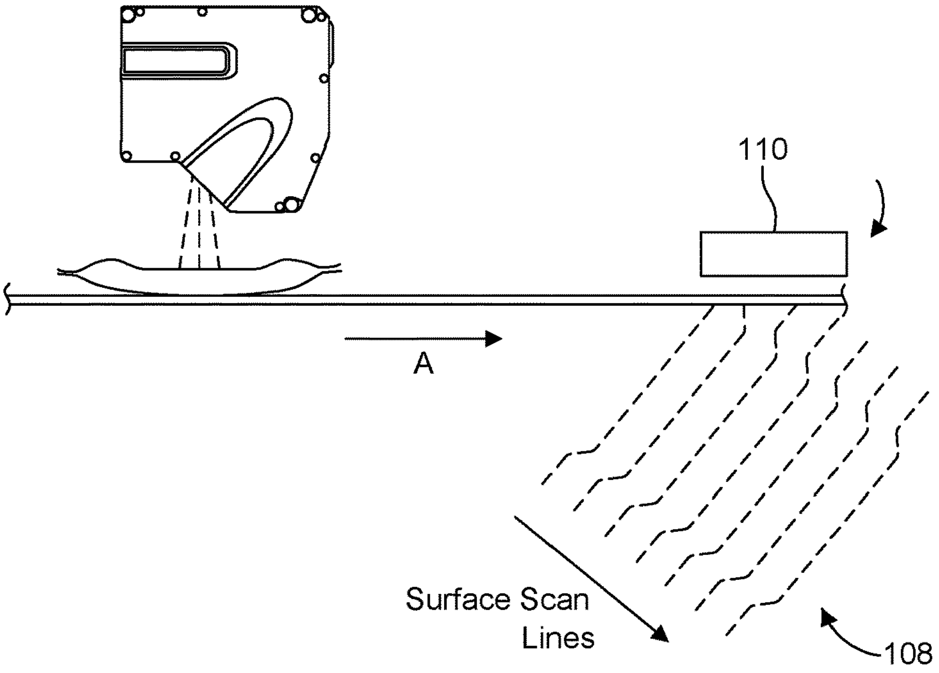

FIGS. 2A and 2B are examples of scan lines derived from scanning an upper surface of bag 103, taken in the direction of arrow B in FIG. 1A. As depicted in these figures, scanner 105 scans bag 103 as the bag is conveyed through the inspection station by conveyor 101. The bag is scanned in multiple scan lines as it passes the inspection station, as depicted at 106, to obtain a collection of multiple scan lines 108 that define the surface profile of the upper surface of bag 103. Each of scan lines 108 defines an area under the scan line, and apparent volume of the bag is may be calculated by obtaining a sum of the areas under each scan line and multiplying by the apparent length L of the bag, as derived from the surface profile. Specifically:

$$\text{Apparent volume} = 2 \times L \times \sum_{i=1}^{N} Ai \qquad \text{Equation (1)}$$

where L is the apparent length of the bag as derived from the surface profile, $A_i$ is the area under each i-th scan line, and N is the number of scan lines within the apparent length L of the bag. The factor "2" is included under the assumption that the unscanned lower surface of the bag, which is not visible to scanner 105, is similar to the scanned upper surface, such as by being a mirror image of the upper surface.

The apparent volume is compared against one or more thresholds, as described below in connection with FIG. 3, to determine whether the apparent volume fits within the threshold(s).

Although in this embodiment apparent volume of the bag is calculated using an assumption that the unscanned lower surface of the bag is similar to the scanned upper surface, in other embodiments this assumption need not be made, with the threshold(s) adjusted accordingly. For example, the apparent volume may be calculated as a rectangular box down to the surface of conveyor 101, with a bag-shaped top to the box as determined by the scanned profile of the upper surface of the bag. In this case, the threshold(s) are adjusted upwardly to compensate for the increase in apparent volume.

Reverting to FIG. 1A, the apparent volume of bag 103 at inspection station 104 is calculated by controller 109, for example, using Equation (1), and controller 109 then determines whether the calculated apparent volume does or does not fit within a threshold. In the FIG. 1A, all of bags 103 are expected to have similar dimensions, such as a "snack bag" sized approximately $$L_B \times W_B = 6.25 \text{ inches} \times 5.50 \text{ inches}$$

where $L_B$ and $W_B$ are length and width of the bag, respectively. As a result, the threshold used by controller 109 is a predetermined threshold selected in accordance with expected size or volume of the sealable bag.

In other embodiments, the controller calculates horizontal extent of the sealable bag based on the surface profile, and then calculates an individualized threshold for each bag as it is inspected, based on the horizontal extent. For example, reverting to FIG. 2A, the horizontal extent of the sealable bag, based on the surface profile, is depicted at "W" and at "L".

The term "controller" refers to a component configured to interact with and at least partially command operation of various components including, but not limited to conveyor 101, scanner 105 and flapper 110 (described below). The controller commands operation of various components at least in part based on information received from the various components. In some embodiments, the controller comprises a processor and/or a software component.

The term "bag" or "sealable bag" (also referred to as a sachet, pouch, or pillow pack, stand up pouch, gusseted pouch, and so forth) refers to a sealable container for carrying a product, such as snack-sized bags for chips or other snacks, flexible wrapped packages, pouches, sachet, and/or pillow packs. The sealable bag might or might not be sealed.

FIG. 2A depicts a situation where the bag is properly sealed, such that the sum of areas $A_i$ under scan lines 108 yields a calculation of apparent volume that exceeds the threshold. The bag is thus determined to be properly sealed and is advanced by conveyor 101 to a packing station for further processing.

On the other hand, FIG. 2B depicts a situation where the bag is not properly sealed, such that the sum of areas $A_i$ under scan lines 108 yields a calculation of apparent volume that does not exceed the threshold. The bag is thus determined to be improperly sealed and is diverted by flapper 110 (which is not shown in FIG. 2A) to a discard station.

In FIG. 1A, flapper 110 is depicted by a sweeping arm which pivots around a shaft, but other diversion mechanisms can be employed, such as an air blow off assist, sweeping arm into the side, hinged conveyor that drops down, or any other device to remove and/or divert the bag from the conveyor line.

Figure 3:
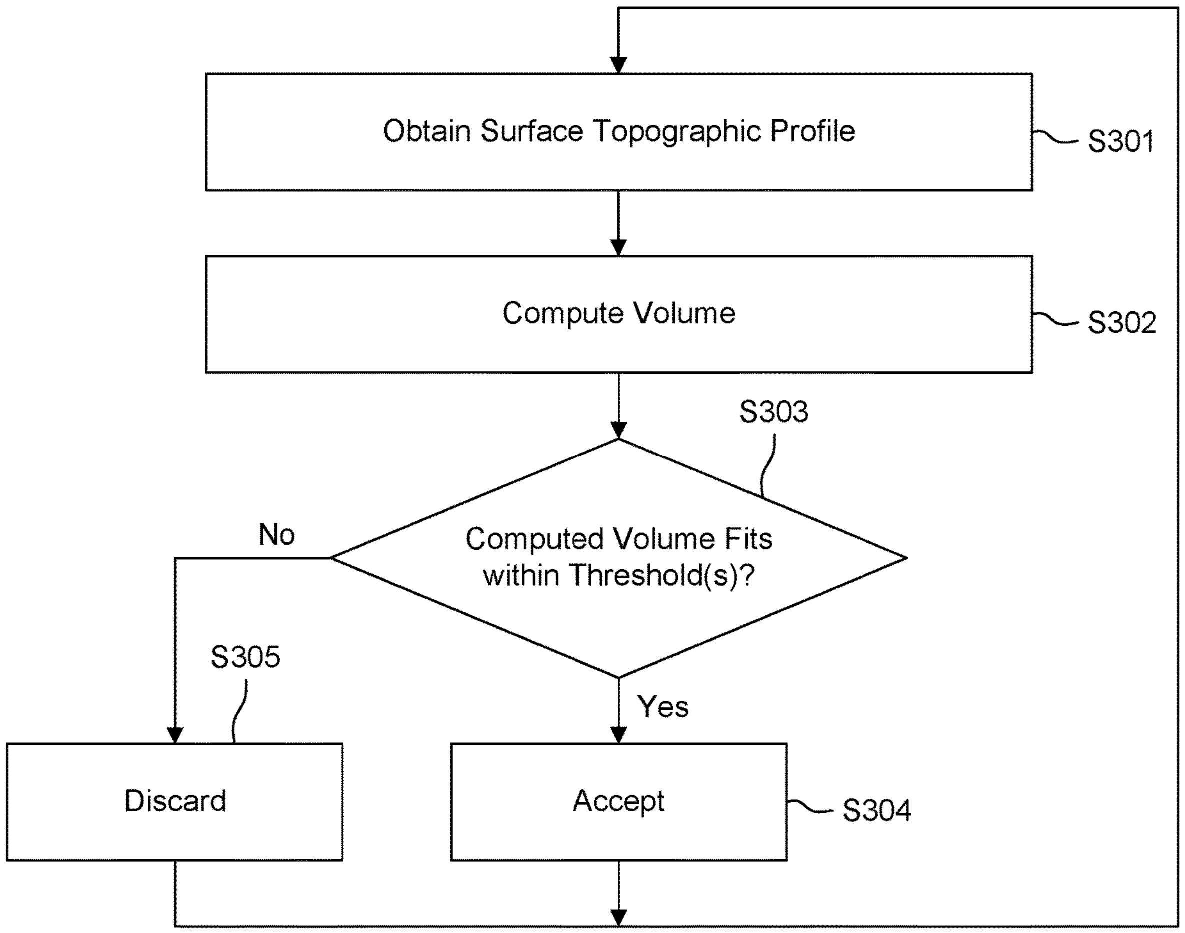
FIG. 3 is a flow diagram depicting an example method for automated sorting of sealable bags according to an embodiment of the disclosure herein.

FIG. 3 is a flow diagram depicting an example method for automated sorting of sealable bags. In general, in FIG. 3, a method for automated sorting of a sealable bag includes contactlessly scanning a surface or surfaces of the sealable bag (upper or lower surface or both) of a sealable bag as the sealable bag is conveyed past an inspection station; obtaining a surface profile topology of the scanned surface; calculating apparent volume of the sealable bag from the surface profile topology; determining whether the apparent volume falls within selected thresholds including thresholds such as over filled, under filled and unsealed bags; and sorting the sealable bag to a discard station responsive to a determination that the apparent volume of the sealable bag does not fit the selected threshold(s).

More specifically, at step S301, a surface profile topology of a surface of sealable bag 103 (here, the upper surface sealable bag 103) is obtained as the bag is conveyed by conveyor 101 past inspection station 104. The surface profile is obtained contactlessly by obtaining multiple scan lines of the upper surface of bag 103 as the bag moves through the inspection station. As indicated above, the scan lines are obtained contactlessly by scanners that rely on light, lidar, patterned light, sonar, acoustic, radar, and so forth, to obtain a surface profile topology of the upper surface of bag 103.

In step S302, the apparent volume of the bag is calculated from the surface profile topology, such as by application of Equation (1), above.

In step S303, the computation of apparent volume is compared against a threshold or thresholds including thresholds such as over filled, under filled and unsealed bags, to determine whether the apparent volume fits within the selected threshold(s). The threshold(s) which may be a predetermined threshold selected in accordance with expected size of the sealable bag, or an individualized calculated threshold which is calculated based on the horizontal extent of the bag.

If step S303 determines that the computation of apparent volume fits within the selected threshold(s), the bag is accepted and is advanced in step S304 to a packing station. On the other hand, if step S303 determines that the computation of apparent volume does not fit within the selected threshold(s), the bag is discarded in step S305 to a discard station.

Figure 4:
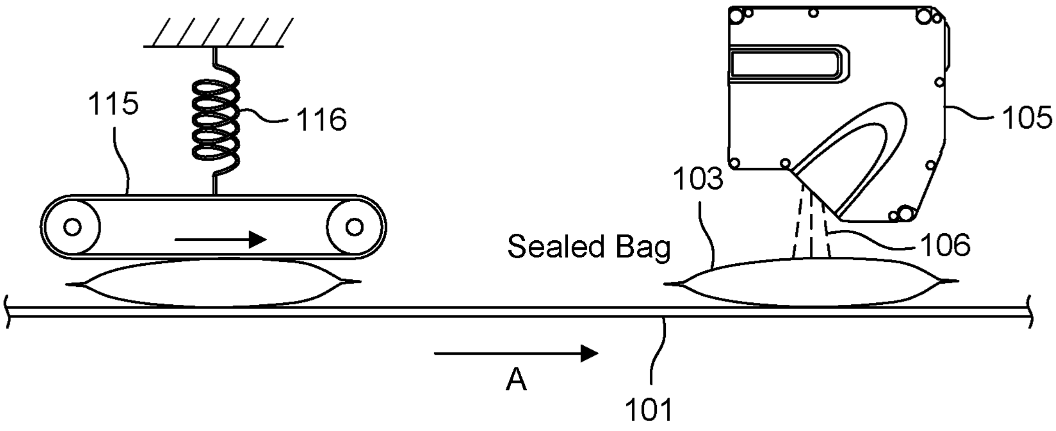
FIG. 4 is a schematic overview showing another example embodiment of a sorting apparatus according to the description herein, depicting pre-scan shaping of a normally shaped bag with a proper seal.

FIG. 4 is a schematic overview showing another example embodiment of a sorting apparatus. In one difference from the FIG. 1A embodiment, the embodiment depicted in FIG. 4 shapes the bag prior to scanning at the inspection station, by the inclusion of a leveling mechanism 115, which applies a gentle pressure to bag 103 as the bag is being conveyed to the inspection station. The gentle pressure is provided by spring loading at 116 of a belt moving at the same or similar speed as conveyor 101, and tends to flatten the bag, prior to scanning at the inspection station, which results in improved accuracy in calculation of the apparent volume, as well as increased consistency in the appearance of the bag when scanning at the inspection station. In FIG. 4, a properly sealed bag is depicted which thus retains its shape after shaping and before scanning by scanner 105 at the inspection station.

Figure 5:
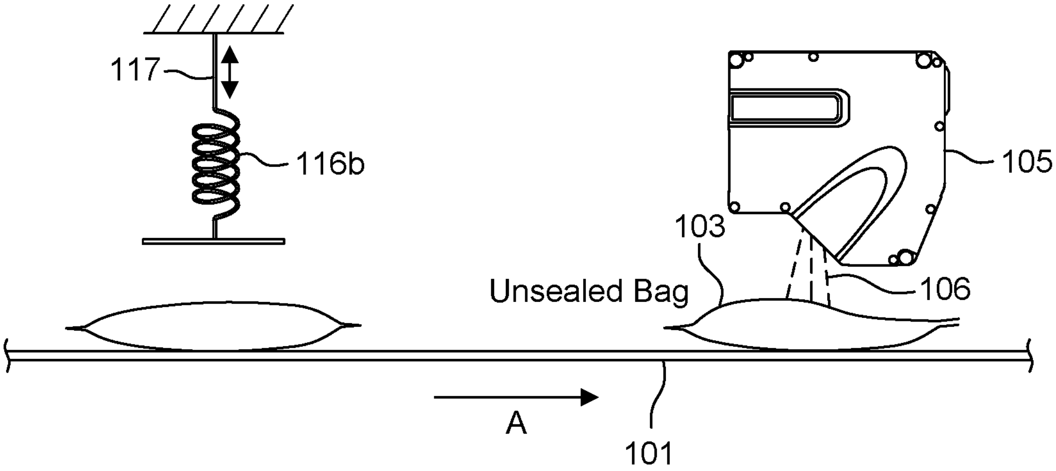
FIG. 5 is a schematic view showing another example embodiment of a sorting apparatus, depicting pre-scan shaping of a bag that is unsealed and therefore deformed by shaping.

FIG. 5 is a schematic view showing another example embodiment of a sorting apparatus. In one difference from the FIG. 1A and FIG. 4 embodiments, the embodiment depicted in FIG. 5 shapes the bag prior to scanning at the inspection station, by the inclusion of a tamping mechanism 117, which moves vertically upward and downward to gently tamp bag 103 as the bag is being conveyed to the inspection station. Gentleness of the tamping pressure is ensured by spring loading of the tamping mechanism at 116*b*, and tends to flatten the bag, prior to scanning at the inspection station, which results in improved accuracy in calculation of the apparent volume, as well as increased consistency in the appearance of the bag when scanning at the inspection station. In FIG. 5, an improperly sealed bag is depicted which thus is deformed after shaping to a reduced volume, since air is expelled by the tamping mechanism 117. The reduction in volume is detected by scanner 105 at the inspection station.

Figure 6A:
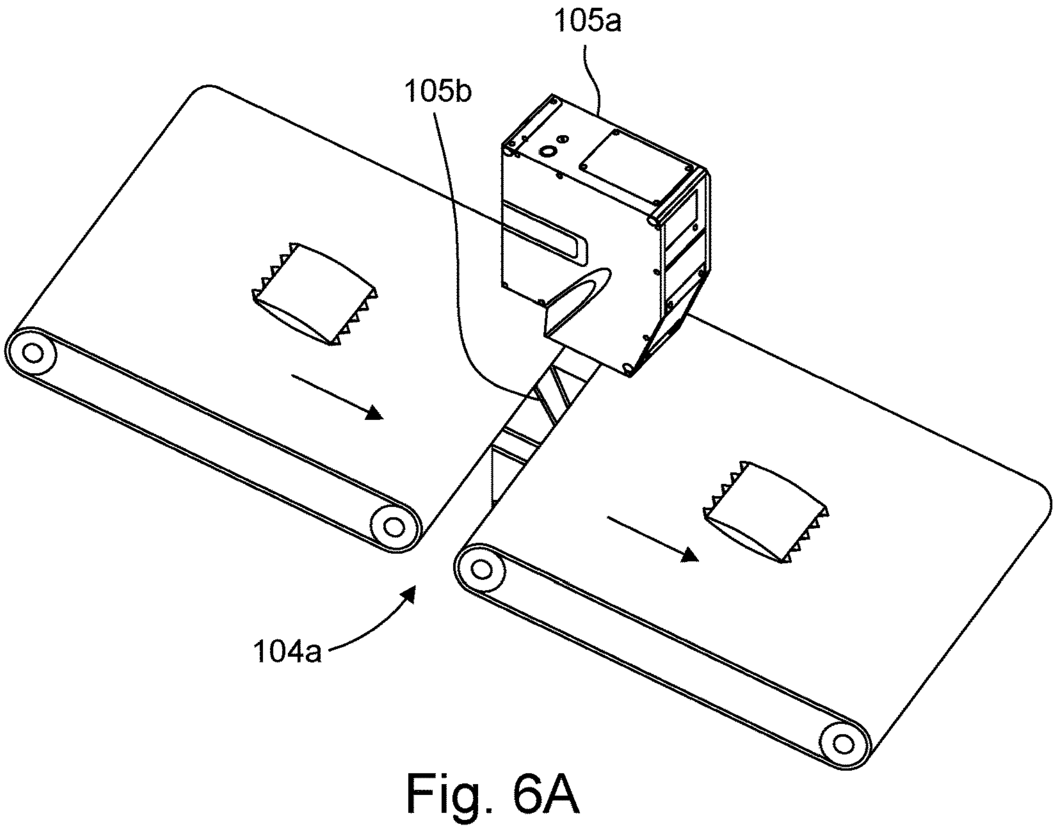
FIGS. 6A and 6B are schematic views showing another example embodiment of a sorting apparatus in which both surfaces of the bag are scanned.
Figure 6B:
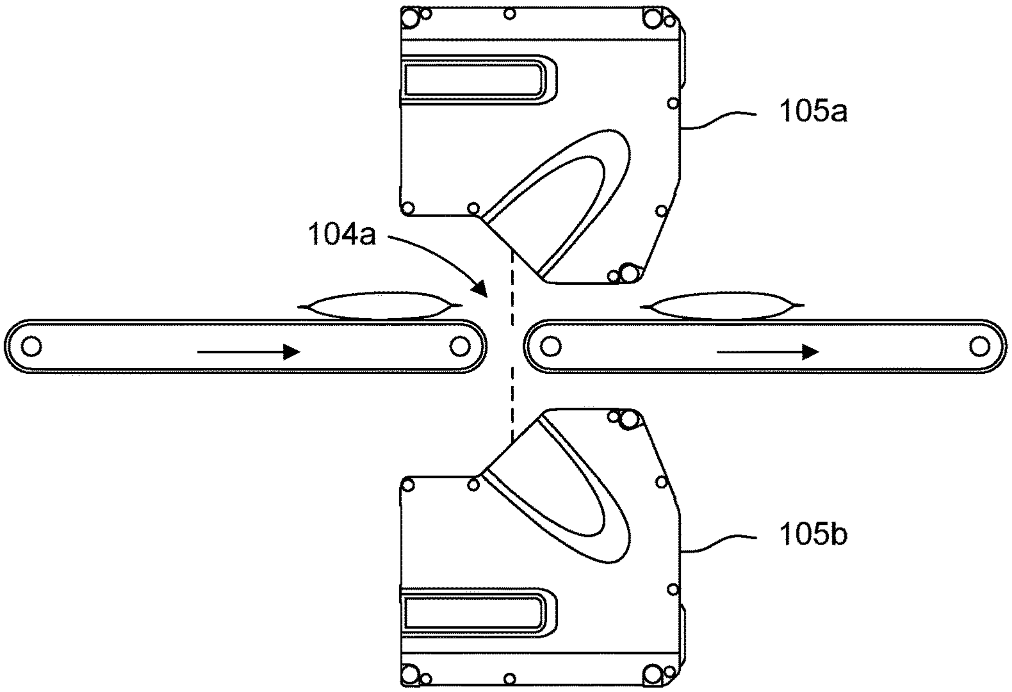

FIGS. 6A and 6B are schematic views showing another example embodiment of a sorting apparatus 100 according to the description herein, in which both surfaces of the bag are scanned.

As depicted in FIGS. 6A and 6B, the sorting apparatus includes a tandem pair of conveyors arranged upstream and downstream with respect to each other, with a narrow gap 104*a* therebetween. A pair of scanners 105*a* and 105*b* are arranged above and below the gap, respectively, to allow scanning of both the upper and lower surfaces. Here, the scanners are arranged directly over the gap to allow simultaneous scanning of the upper and lower surfaces, but it will be understood that scanner 105*a* can be positioned upstream or downstream of the gap so as to scan the upper surface before or after scanning by scanner 105*b*. The gap is sufficiently narrow to allow the bags to pass from the upper conveyor to the lower conveyor without dropping through the gap, and is sufficiently wide to allow scanning of the lower surface by scanner 105*b*.

The bag is scanned in multiple scan lines as it passes the inspection station, to obtain a collection of multiple scan lines that define the surface profiles of both the upper and the lower surfaces of bag 103. Each of the scan lines defines an area under the scan line, and apparent volume of the bag is may be calculated by obtaining a sum of the areas under each scan line and multiplying by the apparent length L of the bag, as derived from the surface profile. Specifically:

$$\text{Apparent volume} = L \times \left(\sum_{i=1}^{N} A_i^U + \sum_{i=1}^{N} A_i^L\right) \quad \text{Equation (2)}$$

where L is the apparent length of the bag as derived from the surface profile, $A_i^L$ is and $A_i^U$ are the areas under each i-th scan line for the lower (L) and upper (U) surfaces, respectively, and N is the number of scan lines within the apparent length L of the bag. Unlike the FIG. 1A embodiment, it is unnecessary to make an assumption about the profile of an unscanned surface, given that both surfaces are being scanned.

Figure 7:
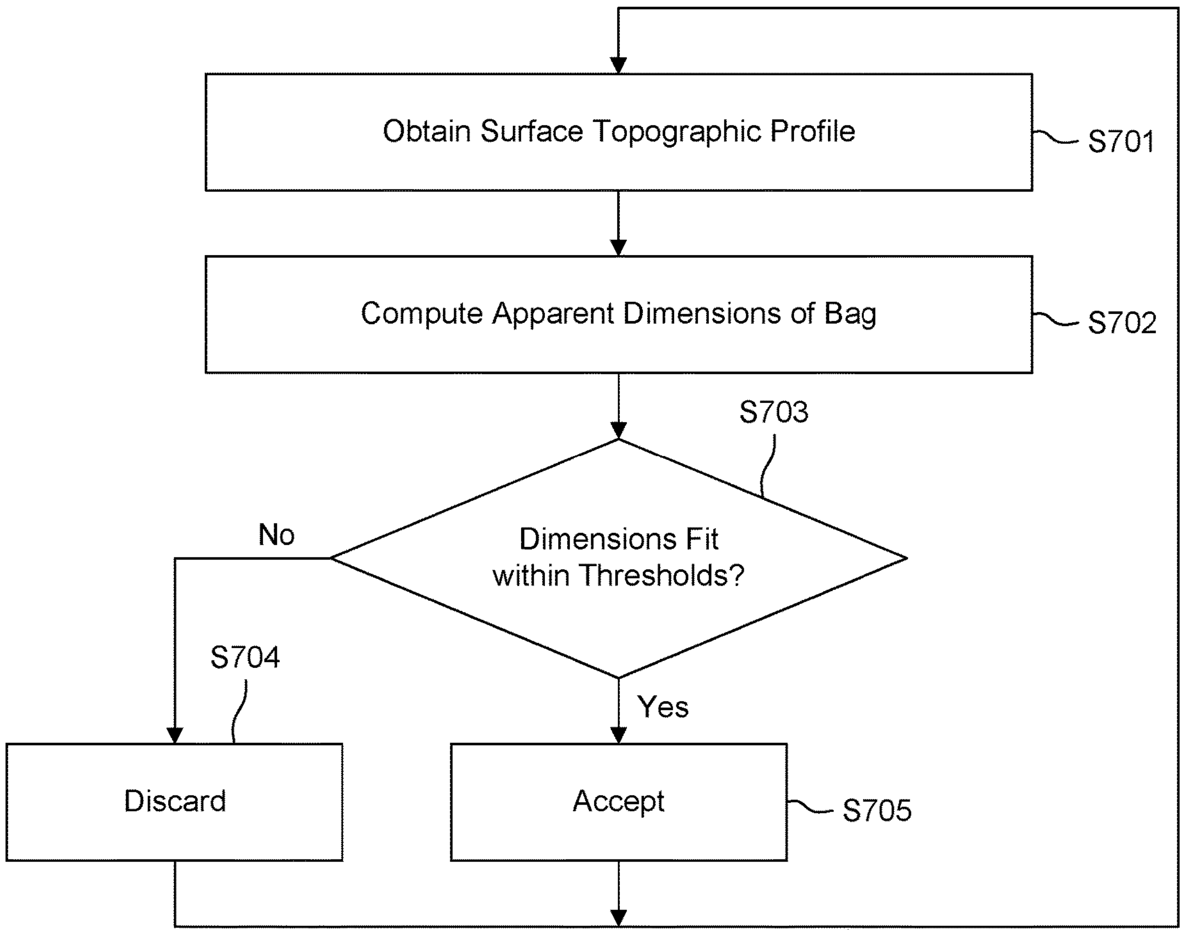
FIG. 7 is a flow diagram showing use of thresholds in addition to or other than volume thresholds

FIG. 7 is a flow diagram showing use of thresholds in addition to or other than volume thresholds. As depicted in FIG. 7, after obtaining a surface profile of the scanned bag at step S701, there is a computation at step S702 of the dimensions of the bag, including, for example, any one or more of height, horizontal extent (size), volume and so forth. At step S703, there is a determination of whether the computed dimensions fit within a selected one or more of thresholds that include, for example, over filled, under filled and unsealed bags. For example, an over-filled bag may be determined by a height that exceeds a maximum height and an under-filled bag may be determined by a height less than a minimum height.

If step S703 determines that the dimensions of the bag fit within the selected threshold(s), the bag is accepted and is advanced in step S705 to a packing station. On the other hand, if step S703 determines that the dimensions of the bag fit within the selected threshold(s), the bag is discarded in step S704 to a discard station.

The embodiments illustrated and discussed in this specification are intended only to teach those skilled in the art how to make and use the disclosure herein. It will be understood that the features of the various embodiments may be combined, for example, scanning of both the upper and lower surfaces may be combined with a tamping or leveling mechanism, or with use of thresholds in addition to or other than volume thresholds.

In describing embodiments of the disclosure herein, specific terminology is employed for the sake of clarity. However, the disclosure herein is not intended to be limited to the specific terminology so selected. The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. Apparatus for automated testing of airtightness of the seal of a flexible sealable bag, comprising:

a conveyor configured to convey a flexible sealable bag past an inspection station;

a multi-line scanner configured and positioned to contactlessly scan multiple scan lines across a width of a surface of the flexible sealable bag as the flexible sealable bag passes through the inspection station, each of such scan lines defining an area of the bag under such scan line, so as to obtain a surface profile topology of the scanned surface from the multiple scan lines;

a controller configured (i) to set a volume threshold for the flexible sealable bag, wherein the volume threshold is set in correspondence to volume of an unsealed bag, (ii) to calculate volume of the flexible sealable bag from the surface profile topology, (iii) to compare the calculated volume to the volume threshold, (iv) to determine whether the calculated volume is or is not less than the volume threshold, and (v) to determine that the seal on the flexible sealable bag is airtight responsive to a determination that the calculated volume is not less than the volume threshold; and a sorting mechanism, wherein the sorting mechanism is controlled by the controller to sort the flexible sealable bag to a discard station responsive to the determination by the controller that the seal on the flexible sealable bag is not airtight.

2. The apparatus according to claim 1, wherein the scanner contactlessly scans the scanned surface of the sealable bag by means of one or more than one of light, lidar, patterned light, sonar, acoustic, and radar, or combination of any or all of these techniques.

3. The apparatus according to claim 1, wherein the volume threshold is a predetermined threshold selected in accordance with expected size of the sealable bag.

4. The apparatus according to claim 1, wherein the controller is further configured to calculate horizontal extent of the sealable bag based on the surface profile, and wherein the volume threshold is calculated on a per-bag basis based on the horizontal extent.

5. The apparatus according to claim 1, wherein the calculated volume comprises an apparent volume which is calculated under an assumption that the unscanned surface of the sealable bag is a mirror image of the scanned surface.

6. The apparatus according to claim 1, further comprising a shaping mechanism positioned upstream of the inspection station in a conveyance direction of the conveyor, for shaping the sealable bag prior to scanning at the inspection station, so as to expel air from unsealed bags.

7. The apparatus according to claim 6, wherein the calculated volume comprises an apparent volume which is calculated under an assumption that the unscanned surface of the sealable bag is a mirror image of the scanned surface.

8. The apparatus according to claim 1, further comprising scanning of both surfaces of the bag, wherein the calculated volume is calculated using the scan of both surfaces.

9. The apparatus according to claim 8, wherein the volume of the flexible sealable bag from the surface profile topology is calculated according to equation $$\text{Volume} = L \times \left(\sum_{i=1}^{N} A_i^U + \sum_{i=1}^{N} A_i^L\right)$$

where L is the apparent length of the bag as derived from the surface profile, A_i^L and A_i^U are the areas under each i-th scan line for the lower (L) and upper (U) surfaces, respectively, and N is the number of scan lines within the apparent length L of the bag.

10. The apparatus according to claim 1, wherein the volume threshold includes a selected one of multiple thresholds that define over filled, under filled and unsealed bags, and wherein the controller controls the sorting mechanism to sort the sealable bag to the discard station responsive to a determination that the calculated volume does not fit with the selected threshold.

11. The apparatus according to claim 1, wherein the surface profile topology of the scanned surface is a three-dimensional rendering of the surface of the bag obtained as the bag is conveyed past the inspection station.

12. The apparatus according to claim 1, wherein the bag conveyed past the inspection station by the conveyor is unflattened prior to being conveyed past the inspection station.

13. The apparatus according to claim 1, wherein the bag conveyed past the inspection station by the conveyor is unflattened from a time when it first appears on the conveyor to a time when the bag is conveyed past the inspection station.

14. The apparatus according to claim 1, wherein the volume of the flexible sealable bag from the surface profile topology is calculated according to equation $$\text{Volume} = 2 \times L \times \sum_{i=1}^{N} Ai$$

where L is the apparent length of the bag as derived from the surface profile, A_i is the area of the bag under each i-th scan line, and N is the number of scan lines within the apparent length L of the bag.

15. A method for automated testing of airtightness of the seal of a flexible sealable bag, comprising:

contactlessly scanning multiple scan lines across a width of a surface of a sealable bag as the flexible sealable bag is conveyed past an inspection station, wherein each of such scan lines defines an area of the bag under such scan line;

obtaining a surface profile topology of the scanned surface from the multiple scan lines;

setting a volume threshold for the flexible sealable bag, wherein the volume threshold is set in correspondence to volume of an unsealed bag;

calculating volume of the flexible sealable bag from the surface profile topology;

comparing the calculated volume to the volume threshold;

determining whether the calculated volume is or is not less than the volume threshold;

determining that the seal on the flexible sealable bag is airtight responsive to a determination that the calculated volume is not less than the volume threshold; and sorting the flexible sealable bag to a discard station responsive to the determination in the determining step that the seal on the flexible sealable bag is not airtight.

16. The method according to claim 15, wherein the scanned surface of the sealable bag is contactlessly scanned by means of one or more than one of light, lidar, patterned light, sonar, acoustic, and radar, or combination of any or all of these techniques.

17. The method according to claim 15, wherein the volume threshold is a predetermined threshold selected in accordance with expected size of the sealable bag.

18. The method according to claim 15, further comprising calculating horizontal extent of the sealable bag based on the surface profile, and wherein the volume threshold is calculated on a per-bag basis based on the horizontal extent.

19. The method according to claim 15, wherein the calculated volume comprises an apparent volume which is calculated under an assumption that the unscanned surface of the sealable bag is a mirror image of the scanned surface.

20. The method according to claim 15, further comprising shaping the sealable bag prior to scanning at the inspection station, so as to expel air from unsealed bags.

21. The method according to claim 20, wherein the calculated volume comprises an apparent volume which is calculated under an assumption that the unscanned surface of the sealable bag is a mirror image of the scanned surface.

22. The method according to claim 15, further comprising scanning of both surfaces of the bag, wherein the calculated volume is calculated using the scan of both surfaces.

23. The method according to claim 15, wherein the volume threshold includes a selected one of multiple thresholds that define over filled, under filled and unsealed bags, and wherein the controller controls the sorting mechanism to sort the sealable bag to the discard station responsive to a determination that the calculated volume does not fit with the selected threshold.

24. The method according to claim 15, wherein the surface profile topology of the scanned surface obtained in the obtaining step is a three-dimensional rendering of the surface of the bag obtained as the bag is conveyed past the inspection station.

25. The method according to claim 15, wherein the bag conveyed past the inspection station is unflattened prior to being conveyed past the inspection station.

26. The method according to claim 15, wherein the bag is conveyed past the inspection station by a conveyor, and wherein the bag is unflattened from a time when it first appears on the conveyor to a time when the bag is conveyed past the inspection station.

27. Apparatus for automated testing of an unflattened flexible sealable bag, comprising:

a conveyor configured to convey a flexible sealable bag past an inspection station, wherein the sealable bag is unflattened prior to being conveyed past the inspection station;

a multi-line scanner configured and positioned to contactlessly scan multiple scan lines across a width of a surface of the flexible sealable bag as the flexible sealable bag passes through the inspection station, each of such scan lines defining a shape of the bag under such scan line, so as to obtain a surface profile topology of the scanned surface from the multiple scan lines;

a controller configured to calculate an apparent dimension of the sealable bag from the surface profile topology, and to determine whether the apparent dimension fits within a threshold; and a sorting mechanism, wherein the sorting mechanism is controlled by the controller to sort the sealable bag to a discard station responsive to a determination that the apparent dimension of the sealable bag does not fit within the threshold.

28. The apparatus according to claim 27, wherein the apparent dimension includes volume of the sealable bag and wherein the threshold is a volume threshold.

29. The apparatus according to claim 27, wherein the threshold is a fixed threshold.

30. The apparatus according to claim 27, wherein the threshold is a calculated threshold which is individualized for each bag as it is inspected and which is applied on a per-bag basis.

31. The apparatus according to claim 30, wherein the calculated threshold is calculated at least in part based on horizontal extent.

32. The apparatus according to claim 30, wherein the calculated threshold is calculated at least in part based on an expected dimension of the sealable bag.

33. The apparatus according to claim 27, wherein the surface profile topology of the scanned surface is a three-dimensional rendering of the surface of the bag obtained as the bag is conveyed past the inspection station.

34. The apparatus according to claim 27, wherein the bag conveyed past the inspection station by the conveyor is unshaped from a time when it first appears on the conveyor to a time when the bag is conveyed past the inspection station.

* * * * *